United States Patent
Srinivasaraghavan

(10) Patent No.: US 11,615,158 B2
(45) Date of Patent: Mar. 28, 2023

(54) SYSTEM AND METHOD FOR UN-BIASING USER PERSONALIZATIONS AND RECOMMENDATIONS

(71) Applicant: VERIZON PATENT AND LICENSING INC., Basking Ridge, NJ (US)

(72) Inventor: Haripriya Srinivasaraghavan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/406,199

(22) Filed: Aug. 19, 2021

(65) Prior Publication Data

US 2023/0057423 A1 Feb. 23, 2023

(51) Int. Cl.
*G06F 16/9535* (2019.01)
*G06F 3/0484* (2022.01)
*G06N 20/00* (2019.01)
*G06F 16/9532* (2019.01)
*G06F 3/0482* (2013.01)

(52) U.S. Cl.
CPC ........ *G06F 16/9535* (2019.01); *G06F 3/0482* (2013.01); *G06F 3/0484* (2013.01); *G06F 16/9532* (2019.01); *G06N 20/00* (2019.01)

(58) Field of Classification Search
CPC .............. G06F 16/9535; G06F 3/0482; G06F 3/0484; G06F 16/9532; G06N 20/00
See application file for complete search history.

(56) References Cited

U.S. PATENT DOCUMENTS

| 8,886,644 B1 * | 11/2014 | Stracke, Jr. ............. G06F 17/30 707/732 |
| 2005/0131866 A1 * | 6/2005 | Badros et al. .......... G06F 17/30 707/3 |

OTHER PUBLICATIONS

Five Ways to depersonalize Goodie search results, Dennis O'Reilly, May 14, 2012 https://www.cnet.com/how-to/five-ways-to-depersonalize-google-search-results/ (Year: 2012).*

* cited by examiner

*Primary Examiner* — Pei Yong Weng

(57) ABSTRACT

Disclosed are systems and methods for an electronic framework that enables un-biasing of personalizations for users. The disclosed framework provides controls that can enable users to selectively escape from previously conceived notions of a user's preferred tastes and/or interests. Upon a user requesting content, the disclosed framework can analyze the type of request as well as the modeled behavior and preferences of the user, and automatically un-bias or depersonalize content for the user, thereby availing the user to a broader range of content from a larger pool of content then previously made available to the user.

20 Claims, 14 Drawing Sheets

SYSTEM AND METHOD FOR UN-BIASING USER PERSONALIZATIONS AND RECOMMENDATIONS

BACKGROUND

Content providers, services, applications, websites, platforms and other forms of network resources that users access to consume and/or interact with content typically provide such visiting users with personalized content.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

The disclosed systems and methods provide a framework that depersonalizes content for users. That is, currently almost all of the content that is searchable and/or provided to requesting users is personalized. The personalization can be based on, but is not limited to, the user's derived or expressed interests, demographic information, biographic information, online and/or real-world behaviors, and the like. Personalization of content for a user spans, for example, movies, shows, news, books, music, web sites, retail products, sports, and the like.

Over time, systems learn a lot about a user's tastes and may end up providing the user only with things that are similar to what the system has understood as the user being interested in (e.g., what the user is watching, consuming and/or purchasing). This can lead to a user consistently being presented with only a small fraction of the overall content that is actually available for consumption. Moreover, this can result in the user being "pigeon-holed" in a cycle of the system providing the same content to the user without an opportunity for the user to expand beyond his/her perceived niche.

The disclosed systems and methods provide a framework that provides users with an ability to customize their own personalizations. That is, the framework enables users to control personalization of the content they are interacting with in order to avoid biasing of the content that is being provided and/or made available to the user. Rather than simply turning off personalization, the disclosed framework can analyze the type of request as well as the modeled behavior and preferences of a user, and un-bias or break (or free) the user from the preconceived notions of what the user is expected to be interested in by providing the user with a broader range of content from a larger pool of content then previously made available to the user.

Figure 1:
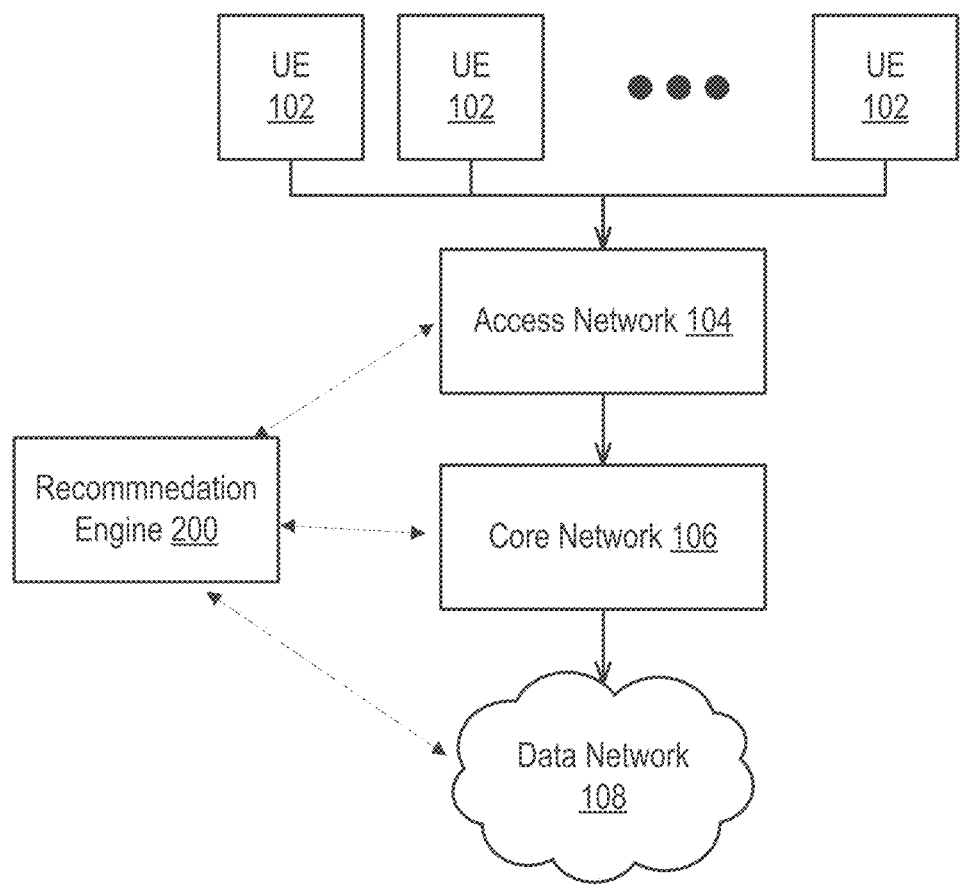
FIG. 1 is a block diagram of an example network architecture according to some embodiments of the present disclosure.

FIG. 1 is a block diagram of an example network architecture according to some embodiments of the present disclosure. In the illustrated embodiment. UE 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, UAVs, wired devices, wireless handsets, and any other devices equipped with a cellular or wireless or wired transceiver. One non-limiting example of a UE is provided in FIG. 14.

In the illustrated embodiment of FIG. 1, the access network 104 comprises a network allowing network communication with UE 102. In general, the access network 104 includes at least one base station that is communicatively coupled to the core network 106 and coupled to zero or more UEs 102.

In some embodiments, the access network 104 comprises a cellular access network, for example, a fifth-generation (5G) network or a fourth-generation (4G) network. In one embodiment, the access network 104 can comprise a Next-Gen Radio Access Network (NG-RAN), which can be communicatively coupled to UE 102. In an embodiment, the access network 104 may include a plurality of base stations (e.g., eNodeB (eNB), gNodeB (gNB)) communicatively connected to UE 102 via an air interface. In one embodiment, the air interface comprises a New Radio (NR) air interface. For example, in a 5G network, UE 102 can be communicatively coupled to each other via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102 via access network 104. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as, but not limited to, the Internet, a local area network (LAN), a wireless LAN, a wide area network (WAN), a mobile edge computing (MEC) network, a private network, a cellular network, and the like.

In the illustrated embodiment, the access network 104 and the core network 106 may be operated by a NO. However, in some embodiments, the networks (104, 106) may be operated by a private entity, different enmities, and the like, and may be closed to public traffic. In these embodiments, the operator of the device can simulate a cellular network, and UE 102 can connect to this network similar to connecting to a national or regional network.

FIG. 1 further includes recommendation engine 200 which can be configured for enabling and/or performing anti-biasing of user personalizations, as discussed below in relation to FIGS. 3-13. In some embodiments, recommendation engine 200 can be a special purpose machine or processor, and can be hosted by or integrated into functionality associated with access network 104, core network 106 and/or data network 108, or some combination thereof.

In some embodiments, recommendation engine 200 can be hosted by any type of network server, such as, but not limited to, an edge node or server, application server, content server, web server, and the like, or any combination thereof.

In some embodiments, recommendation engine 200 can be embodied as a stand-alone application that executes on a networking server. In some embodiments, recommendation engine 200 can function as an application installed on a user's device, and in some embodiments, such application can be a web-based application accessed by the user device over a network. In some embodiments, recommendation engine 200 can be configured and/or installed as an augmenting script, program or application (e.g., a plug-in or extension) to another application or portal data structure.

Figure 2:
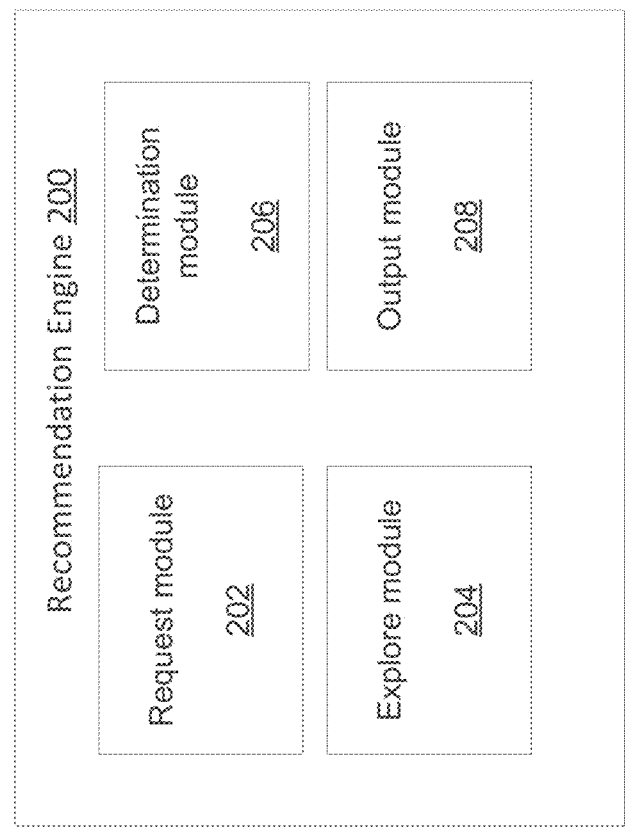
FIG. 2 is a block diagram illustrating components of an exemplary system according to some embodiments of the present disclosure.

As illustrated in FIG. 2, recommendation engine 200 can include, but is not limited to, request module 202, explore module 204, determination module 206 and output module 208. It should be understood that the engine(s) and modules discussed herein are non-exhaustive, as additional or fewer engines and/or modules (or sub-modules) may be applicable to the embodiments of the systems and methods discussed.

According to some embodiments, recommendation engine 200 enables an alternative set and/or a broader set of content to be recommended and/or provided to a user in response to an indication from the user that relates to a request and/or desire to interact with or receive content. More detail of the operations, configurations and functionalities of engine 200 and each of its modules, and their role within embodiments of the present disclosure will be discussed below in relation to FIGS. 3-13.

Figure 3:
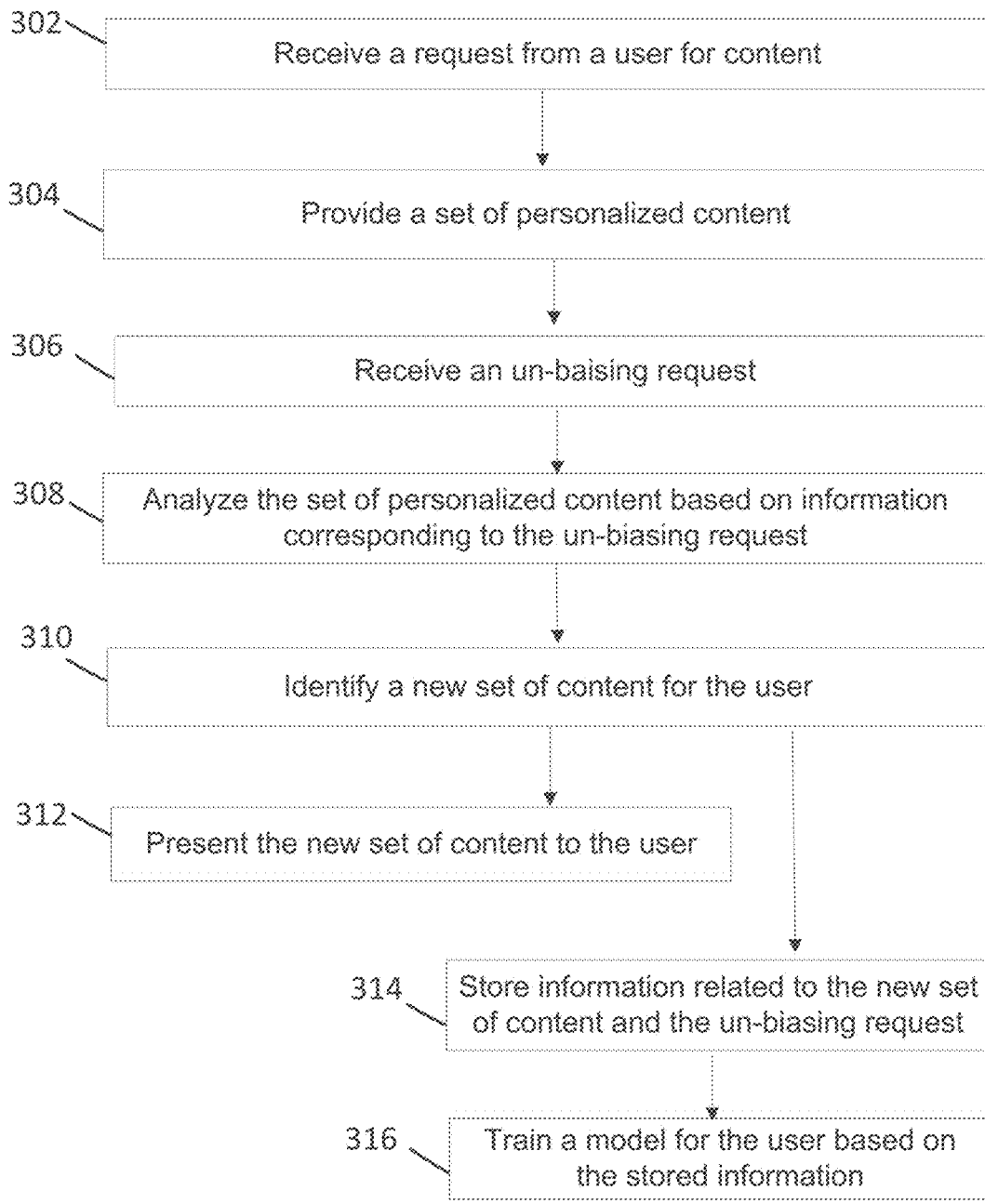
FIG. 3 illustrates an exemplary data flow according to some embodiments of the present disclosure.

FIG. 3 provides Process 300 which details non-limiting example embodiments of engine 200's implementation for recommending un-biased content to a user. As discussed herein, Process 300 of FIG. 3 provides a general overview of engine 200's operation, and FIGS. 600-1200 in FIGS. 6-12, respectively, provide non-limiting examples of particular un-biasing embodiments.

According to some embodiments, Steps 302-304 of Process 300 can be performed by request module 202 of recommendation engine 200; Steps 306-308 can be performed by explore module 204, Step 310 can be performed by determination module 206, and Steps 312-316 can be performed by output module 208.

Process 300 begins with Step 302 where a request from a user for content is received. In some embodiments, this request can be any type of request, input or detected criteria that causes content to be discovered and provided to a user. For example, the request can include, but is not limited to, a search query, detection of the user being at a particular location, a time criteria being satisfied, conditional notifications, opening an application that provides content, visiting a web page, logging into a portal, and/or any other type of request that causes personalized content to be provided to a user.

In Step 304, a set of personalized content is provided to the user. According to some embodiments, Step 304 can include, but is not limited to, engine 200 receiving the request, and providing a recommended set of content items to a user by using a defined recommendation model, which can involve utilizing any type of known or to be known intelligent, artificial intelligence (AI) or machine learning (ML) content personalization model, such as, but not limited to, neural networks, computer vision, vector analysis, and the like. The recommendation model can comprise learned and/or trained personalization (or taste or interest) vectors that indicate the user's tastes, interests, behaviors and/or activities (e.g., real-world and digital actions), and the like.

According to some embodiments, Step 304 involves executing the recommendation model which operates by analyzing of the request from the user, which can include analysis of the data in the request, as well as the data and/or metadata about the user, and formulating a query to search for requested content. The search can involve parsing a stored collection of content, and matching, at least to a similarity threshold level, content data and/or metadata to the user and/or the user's request. As a result, the personalized set of content can be provided to the user.

Figure 4:
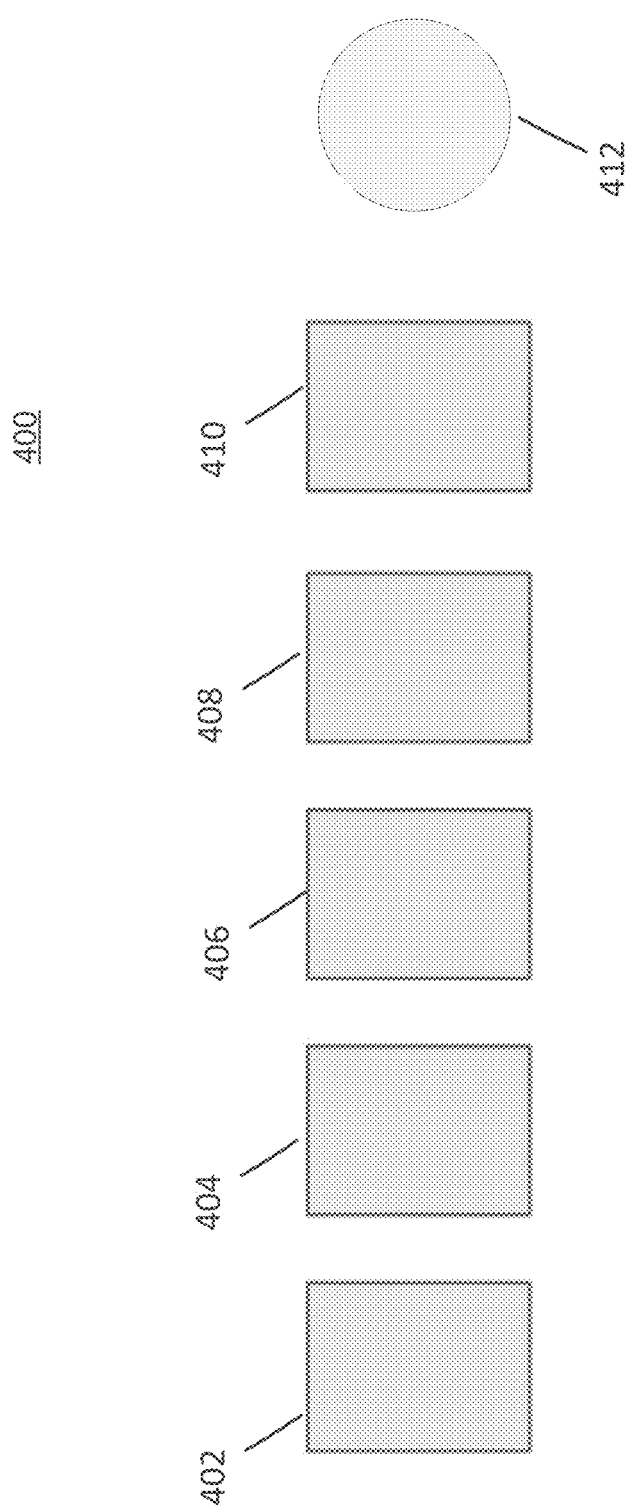
FIG. 4 illustrates a non-limiting example of a user interface (UI) according to some embodiments of the present disclosure.

By way of a non-limiting example, as depicted in the user interface (UI) 400 of FIG. 4, items 402-410 represent a set of 5 content items that can be the personalized set of content from Step 304. For example, items 402-410 can be, but are not limited to, image thumbnails that represent movies on a streaming platform that are being recommended to the user. According to some embodiments, UI 400 further provides an un-biasing (or break or escape) option 412. In some embodiments, option 412 can be a button, icon or any other type of selectable or interactive interface object that can be displayed, embedded, or otherwise depicted within UI 400. Thus, UI 400 can be modified to additionally display option 412 when providing recommended content.

In some embodiments, option 412 can enable other forms of input to be received and/or accepted by UI 400. For example, in some embodiments, option 412 may not be displayed on UI 400, but can represent functionality where if a user provides a voice input request to be un-biased or have provided content be depersonalized, then the capabilities of options 412 are triggered, as discussed below.

It should be understood that the arrangement and orientation of items 402-412 on UI 400 are not intended to be limiting, as content 402-410 and option 412 (e g., icon or button) can be provided/displayed according to any type of known or to be known graphical user interface (GUI) functionality available on web pages, interfaces, applications and/or devices upon which user's view and/or consume content.

Turning back to Process 300 of FIG. 3, in Step 306, engine 200 receives a request to have provided content be un-biased or depersonalized. As discussed above, this can correspond a user requesting a broader and/or alternative selection of content to be recommended or made available to them. As discussed above in relation to FIG. 4, this can involve providing an un-biasing input, which for example, can involve interacting with option 412 (e.g., button) displayed on UI 400. In some embodiments, this can also involve selecting which recommended items the user desires to "escape" from (e g., all or a portion of items 402410), as discussed below.

According to some embodiments, upon receiving the request in Step 306, engine can provide a set of options that enables a particular type of un-biasing (or depersonalization). For example, as illustrated in UI 500 depicted in FIG. 5, items 502-518 (which can be buttons, icons or interface objects) can be displayed on UI 500. In some embodiments, UI 500 can be a modified version of UI 400 such that items 502-518 can be added to UI 400 to realize UI 500. Thus, interaction with option 412 on UI 400 can result in UI 500. In some embodiments, UI 500 can be a separately displayed window or interface. In some embodiments, items 402-410 may not be displayed within UI 500.

According to some embodiments, items 502-518 provide capabilities for executing specific un-biasing methods. For example, interaction with (or selection of) item 502 provides capabilities for un-biasing the results from Step 304 (and items 402-410) based on "examples", as discussed in more detail below in relation to FIG. 6. Similarly, item 504 enables un-biasing based on "attributes", as discussed below in relation to FIG. 7. Item 506 enables un-biasing based on "user clusters", as discussed below in relation to FIG. 8. Item 508 enables un-biasing based on "sentiment", as discussed below in relation to FIG. 9. Item 510 enables "random" un-biasing, as discussed below in relation to FIG. 10. Items 512 and 514 enable un-biasing based on "popularity" and/or "trend", respectively, as discussed below in relation to FIG. 11 (and referred to as "exposure"). Item 516 enables un-biasing based on a "timeline", as discussed below in relation to FIG. 12.

In some embodiments, item 518 enables complete un-biasing of any type of personalization. According to some embodiments, this can involve re-performing the search for content for a user as if this is the first time the user is performing a search and engine 200 does not have any data or metadata about the user (e.g., a new user which does not have any stored information within accessible databases, for example).

Figure 5:
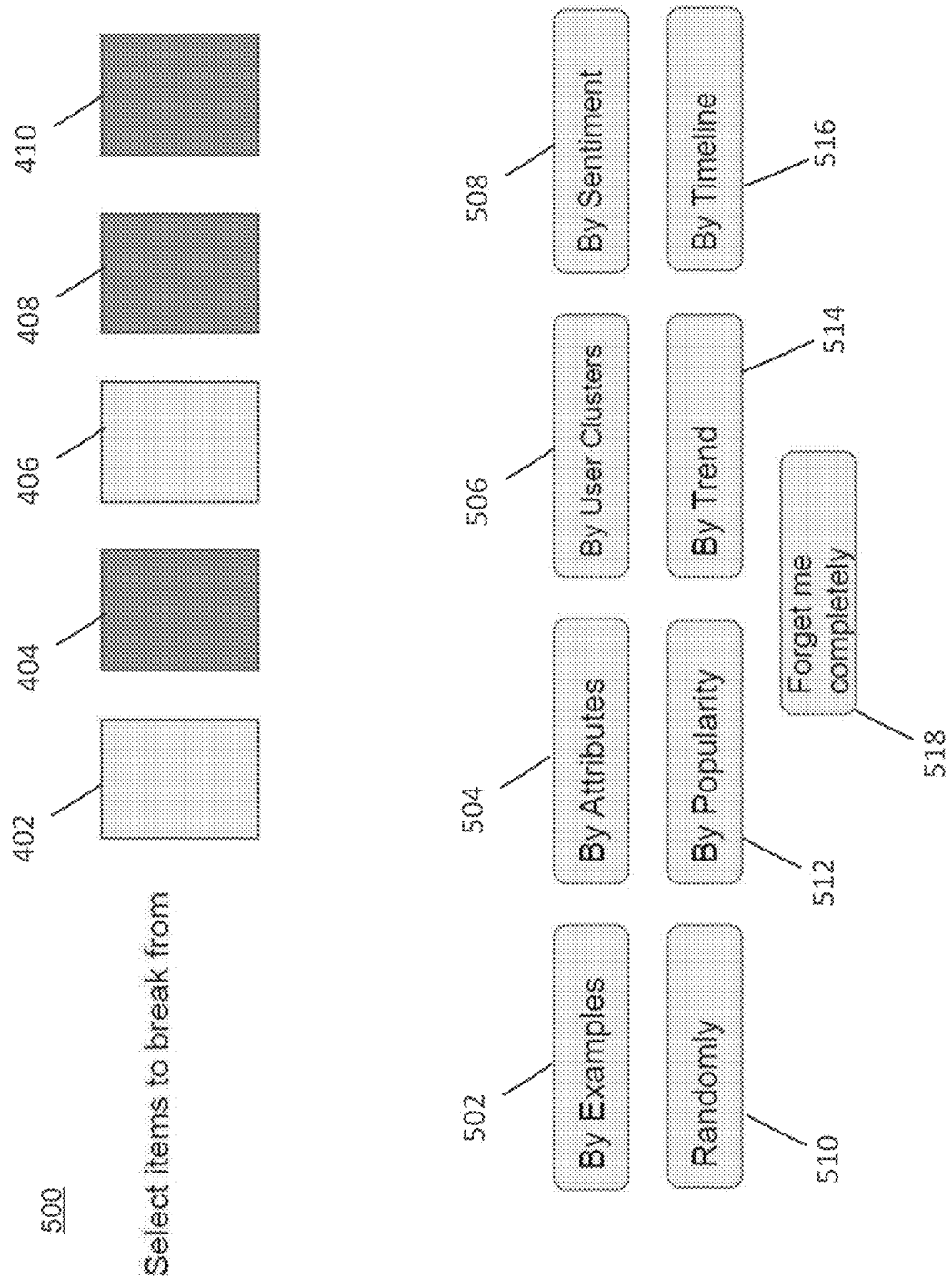
FIG. 5 illustrates a non-limiting example of a UI according to some embodiments of the present disclosure.

By way of a non-limiting example, upon a user being provided a recommended set of movies (items 402-410), the user interacts with option 412 thereby requesting to be un-biased or depersonalized from these recommendations. UI 500 is provided to the user, which enables the user to specifically select items they desire to break or escape from (e.g., items 404, 408 and 410, for example, as illustrated in FIG. 5). UI 500 further provides the user with selection options via items 502-518 for performing specific types of un-biasing, as discussed below.

Thus, according to some embodiments, the request in Step 306 includes information that indicates a desire for a user to escape from a set of previously provided recommendations (and/or criteria that governs how a recommendation model recommends content to the user), and further identifies a type of escape being requested. In some embodiments, the request in Step 306 can identify specific items that can form a basis of the un-biasing request, as discussed below in more detail.

In Step 308, engine 200 analyzes the set of personalized content (from Step 304) based on the information associated with the un-biasing request (from Step 306), and based on this analysis, in Step 310, a new set of content is searched for and identified, which in Step 312 is presented to the user. In some embodiments, at least a portion of the new set of content items identified in Step 310 comprises characteristics that are different from characteristics from the content identified and provided in Step 304, as discussed below. Non-limiting example embodiments of the specific operations of Steps 308-312 are discussed in detail below in relation to Processes 600-1200 of FIGS. 6-12, respectively.

According to some embodiments, in Step 314, the information related to the new set of content and/or the information provided in the un-biasing request (from Step 306) can be stored in association with the user. In Step 316, the recommendation model can be further trained (or re-trained, used interchangeably) based on this information so as to provide automatic un-biasing for the user for future searches, as discussed below. In some embodiments, as discussed below, a new model can be defined for use on future recommendation searches for the user.

Figure 6:
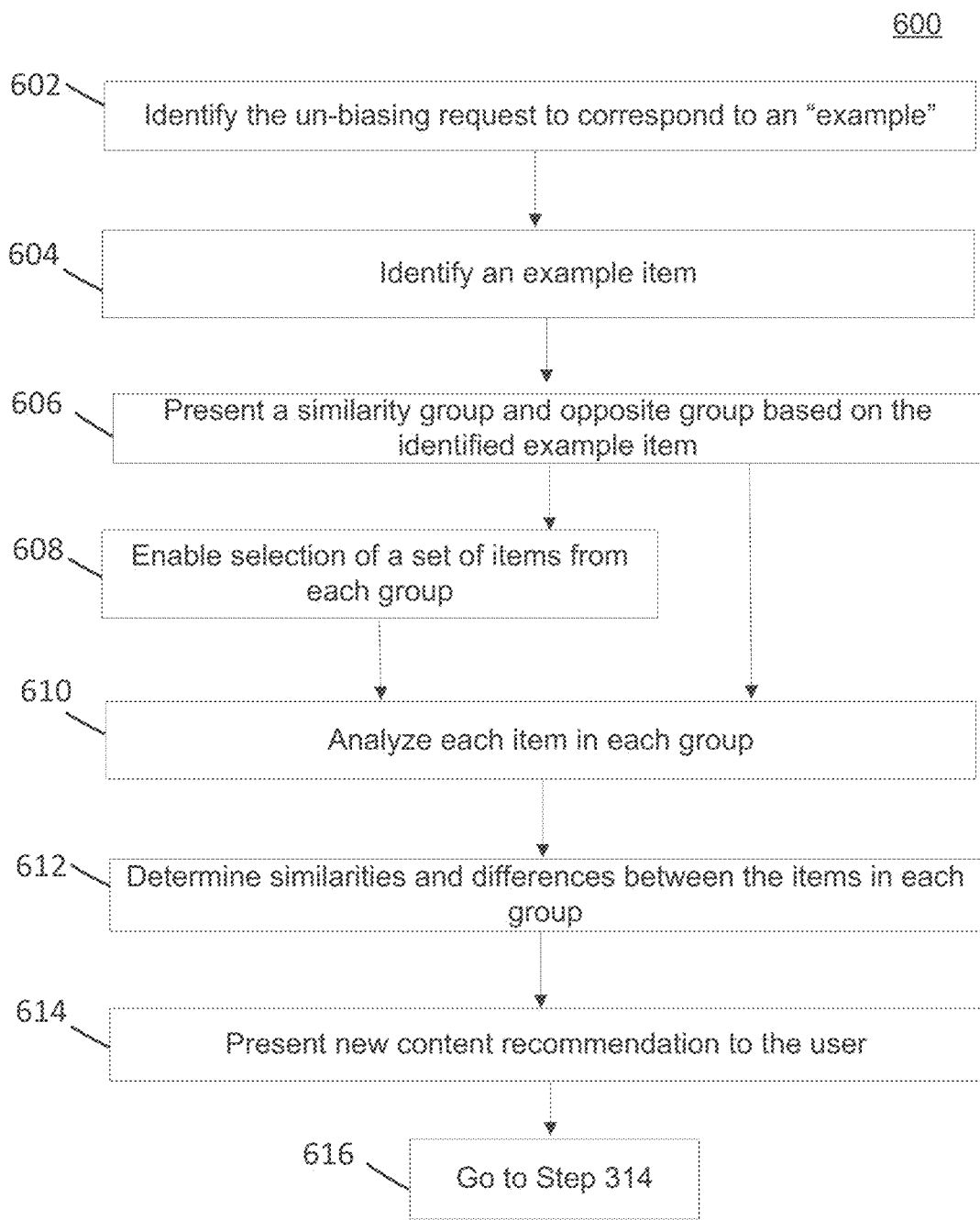
FIG. 6 illustrates an exemplary data flow according to some embodiments of the present disclosure.

Turning to FIG. 6. Process 600 provides a non-limiting example embodiment of performing an un-biasing request that corresponds to an "example" (item 502 of FIG. 5, as discussed above). According to some embodiments, Steps 602-612 of Process 600 can be performed by explore module 204 of recommendation engine 200 (and provide non-limiting example embodiments of Steps 306-312 of Process 300); and Steps 614-616 can be performed by output module 208.

Process 600 begins with Step 602 where an input can be provided by the user that corresponds to an "example" type of depersonalization. In some embodiments, this involves determining similarities and differences between examples of items for purposes of expanding types of content being provided to a user, as discussed herein. For example, Step 602 can involve a user selecting item 502 from UI 500, as discussed above.

In Step 604, an example item(s) (or one or more example items) can be identified. In some embodiments, this can involve the identification of items from a previously provided set of recommendations—for example, a user can select at least one item from items 402-410, as discussed above. For purposes of this discussion, only a single example item will be discussed as being identified in Step 604; however, it should not be construed as limiting any as any number of items (or a whole set of items from a set of previously recommended content items) can be identified without departing from the scope of the instant disclosure.

In Step 606, based on the identified example item, a similarity group and an opposite group of items can be presented to the user. That is, a set of items that are within a threshold satisfying similarity value to the example item are identified (e.g., similarity group), and a set of items that are within a threshold satisfying opposite value to the example item are identified (e.g., opposite group, which includes content items that are opposite of the example). In some embodiments, the "threshold satisfying opposite value" corresponds to the similarity value that the set of items do not satisfy.

For example, the example item identified in Step 604 is a television broadcast of a NFL® game. The similarity group can include similar types of broadcast sports, such as, but not limited to, games from the NBA®, NHL®, NASCAR® and other action-based sports or activities. The opposite group, for example, can include other sports that would be deemed the opposite of the high-action and physicality of football, such as, for example, PGA® golf broadcasts, MLB® games, track and field, and the like. In another example, opposite items to an NFL® game can also be television shows that are not sports related (e.g., sitcoms, talk shows, and the like).

According to some embodiments, Step 606 can involve engine 200 utilizing a vector engine that translates the example item (from Step 604) into a n-dimensional feature vector. Engine 200 can then compute similarities and opposites of at least a portion of the n-dimensions of the example item's feature vector to identify a similarity grouping and an opposite grouping. For example, while NASCAR® races may not have all similar attributes to a football game, it may satisfy particular attributes that constitute a type of viewing experience (e g., fast paced, high action, drama, and the like). Thus, when comparing the vectors between the NFL® game to the NASCAR® race, the race can be deemed to fall within a similarity group because at least a threshold satisfying number of dimensions along the race's vector match the football game's vector. In a similar manner, opposite content items can be discovered based on a threshold satisfying number of dimensions are found to be not matching, or matching below a similarity threshold, as discussed above.

In Step 608, upon presentation of the similarity and opposite groupings of content items, the user can have the ability to select (e.g., like) or remove (or unselect or dislike) a set (e.g., one or more) of items from each group. For example, the user can identify a content item from the similarity grouping they are not interested in, which could cause that item to be removed from the similarity group. In a similar manner, the user can identify a content item from the opposite group that they would like to view (despite them being the opposite of what was recommended).

According to some embodiments, Step 608 can be optional, whereby Process 600 can proceed from Step 606 to Step 610.

In Step 610, each item (remaining, if Step 608 is enabled) in the similarity and opposite groupings are analyzed. According to some embodiments, the analysis performed in Step 610 can be performed by engine 200 executing a vector analysis model that analyzes the items in each grouping (e.g., feature vectors of each item are analyzed) and determines their corresponding attributes. In some embodiments, the analysis can also be performed by any other known or to be known computational analysis technique and/or AI/ML classifier, algorithm, mechanism or technology, including, but not limited to, computer vision, neural networks, cluster analysis, data mining, Bayesian network analysis, Hidden Markov models, logical models and/or tree analysis, and the like.

In Step 612, based on the analysis from Step 610, a determination of similarities and differences between the items in each group is performed. In some embodiments, Step 610 can involve determining similarities and differences between, but not limited to, items that were selected and/or removed in the similarity group to the items that were selected and/or removed in the opposite group (as discussed above in Step 608).

In Step 614, a new content recommendation can be identified and provided to the user. The content items included in the recommendation can be identified and provided based on the determinations from Step 612, and in a similar manner as discussed above. According to some embodiments, the determined similarities and differences between the items in each group, as determined in Step 612, can be utilized as training data to train a new recommendation model, or re-train the existing recommendation model (used in Step 304 for the initial recommendation). Thus, the new model or re-trained model can be used to identify and present the content to the user in Step 614.

In Step 616, the training data and/or information related to the new/re-trained model can be stored in an associated database in a similar manner as discussed above in relation to Step 314.

Figure 7:
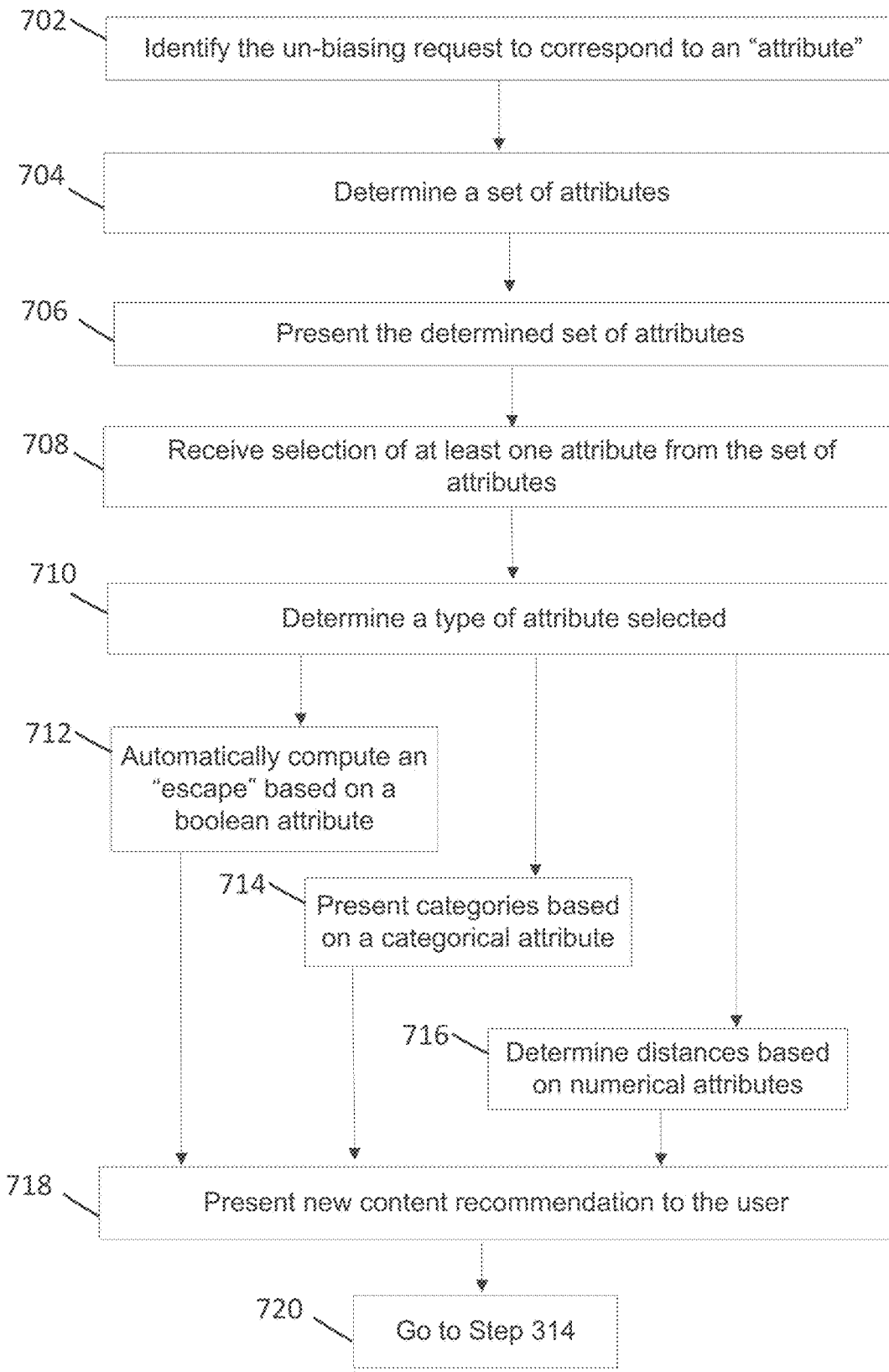
FIG. 7 illustrates an exemplary data flow according to some embodiments of the present disclosure.

In FIG. 7, Process 700 is disclosed which provides a non-limiting example embodiment for performing an un-biasing request that corresponds to an "attribute" (item 504 of FIG. 5, as discussed above). According to some embodiments, Steps 702-716 of Process 700 can be performed by explore module 204 of recommendation engine 200 (and provide non-limiting example embodiments of Steps 306-312 of Process 300); and Steps 718-720 can be performed by output module 208.

Process 700 begins with Step 702 where an input can be provided by the user that corresponds to an "attribute" (or attributes) type of depersonalization. In some embodiments, this involves identifying an attribute(s) (e.g., a characteristic or feature) of a content item(s) that can be excluded or "escaped" from during content selection, as discussed herein. For example, Step 702 can involve a user selecting item 504 from UI 500, as discussed above.

In Step 704, a set of attributes are determined, derived or otherwise identified. In some embodiments, the attributes that can be derived can be based on at least one of the items in the recommended content set (from Step 304) and/or the user's current taste or interest (or personalization) information (which can be formulated as a taste vector(s) (or interest or personalization vector(s), used interchangeably)).

In Step 706, the determined attribute set can be presented to the user, whereby, in Step 708, a selection of at least one attribute is received. For purposes of this discussion, a single attribute will be discussed as being selected; however, it should not be construed as limiting as a plurality of attributes can be selected which would not depart from the disclosed scope of the instant disclosure.

In Step 710, engine 200 analyzes the attribute, and determines the type of attribute that was selected in Step 708. In some embodiments, the type of attribute can be, but is not limited to, a boolean attribute (e g., true or false— whether the element exists or is requested, or whether it does not exist or is not requested), a categorical attribute, and a numerical attribute (e.g., values for each type of content that describe the content).

When it is determined that the attribute is a boolean attribute, Process 700 proceeds from Step 710 to Step 712 where engine 200 automatically computes an escape in a boolean manner. For example, if the attribute corresponds to a "sports" game (e.g., "true" boolean value), then escaping that attribute in a boolean manner provides content or an attribute(s) that is not that attribute (e.g., "false" boolean value) for example, any type of content that is not "sports" related content, such as, for example, a soap-opera television show.

In some embodiment, the determined information from Step 712 can then be used to identify and present new content to the user, as in Step 718. Moreover, in a similar manner as discussed above, the information related to the new content recommendation and the boolean attribute information from Step 712 can be stored and used train a new model and/or re-train the recommendation model, as in Step 720.

When it is determined that the attribute is categorical, Process 700 proceeds from Step 710 to Step 714 where engine 200 automatically determines and presents categories that can be related to the attribute so that the user can select the categories to escape from. For example, if the attribute corresponds a NFL® football game, then the determined categories can be "sports" and "football".

In some embodiment, the determined information from Step 714 can then be used to identify and present new content to the user, as in Step 718. Moreover, in a similar manner as discussed above, the information related to the new content recommendation and the categorical attribute information from Step 714 can be stored and used to train a new model and/or re-train the recommendation model, as in Step 720.

When it is determined that the attribute is numerical, Process 700 proceeds from Step 710 to Step 716 where engine 200 automatically determines attributes or content with attributes that have values that are at least a threshold distance to the selected attribute's value (from Step 708). In some embodiments, the distance calculations can be based on vector analysis computations executed by a vector analysis ML model. This can enable the identification of content that is minimally opposite the content the user is attempting to escape from. For example, if an attribute corresponds to "sports", then "comedy" may be an attribute that is a distance far enough from "sports" to provide alternative or broader content options.

In some embodiment, the determined information from Step 716 can then be used to identify and present new content to the user, as in Step 718. Moreover, in a similar manner as discussed above, the information related to the new content recommendation and the numerical attribute information from Step 716 can be stored and used train a new model and/or re-train the recommendation model, as in Step 720.

Figure 8:
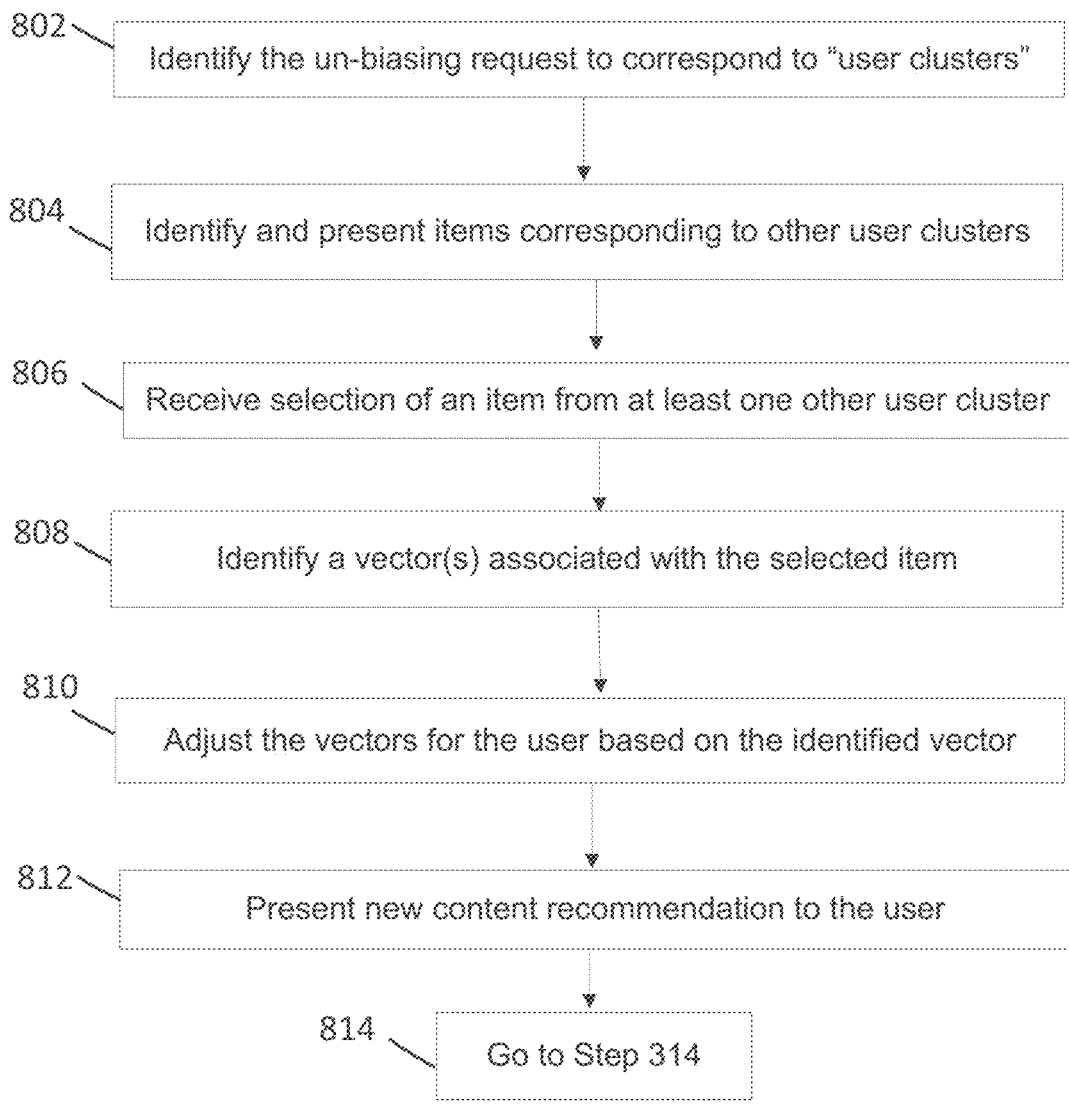
FIG. 8 illustrates an exemplary data flow according to some embodiments of the present disclosure.

In FIG. 8, Process 800 is disclosed which provides a non-limiting example embodiment for performing an un-biasing request that corresponds to "user clusters" (item 506 of FIG. 5, as discussed above). According to some embodiments, Steps 802-810 of Process 800 can be performed by explore module 204 of recommendation engine 200 (and provide non-limiting example embodiments of Steps 306-312 of Process 300); and Steps 812-814 can be performed by output module 208.

Process 800 begins with Step 802 where an input can be provided by the user that corresponds to a "user clusters" type of depersonalization. Thus, for example, Step 802 can involve a user selecting item 506 from UI 500, as discussed above. In some embodiments, this can involve identifying user clusters, or cluster of users and/or tastes/interests that the user is currently affiliated with.

By way of a non-limiting example, a user cluster can be associated with a group of users that are interested in the same type of content and/or are from the same geographic region or demographic grouping, or other type of data that can be used to group similar users and/or similar activities of users. In some embodiments, such cluster can be represented by n-dimensional vectors that represent values of interest and/or affiliation of the user to each topic or context that each cluster represents.

In Step 804, a set of other user clusters are identified and presented to the user. According to some embodiments, the other clusters can be clusters that are similar and/or opposite to the user cluster (of Step 802), which can be determined in a similar manner as discussed above (at least in relation to Process 600, above). For example, clusters that are associated with different contexts than the user cluster that is associated with the user, as discussed above in relation to Step 802.

According to some embodiments, Step 804 can involve a user cluster (from Step 802), which as discussed above, can be a vector, can be represented as $V_i = (s1, s2, s3, \ldots, sm)$, where "s" represents data objects of users falling within cluster vector V. In some embodiments, to identify the other clusters, centroids of the cluster data can be determined which can be used to identify which other clusters (and/or the items therein) correspond to the centroids at least within (for similarity) or at least beyond (for opposites) a threshold distance. For example, an identification of centroids for a cluster can then be performed. For example, a centroid "u" for s1 of Vi can be: $(u1_{s1}, u1_{s2}, u1_{s3}, \ldots, u1_{sm})$. For s2, s3, ..., and sm, the same form of centroid can be identified: u2, u3, ..., and um, respectively. Engine 200 can then compute which content items, and/or other user clusters are similar or opposite to the computed centroids. In some embodiments, this can be performed by engine 200 performing vector analysis techniques to determine which vector nodes have similar or different dimensional values in view of a similarity threshold.

Thus, in Step 804, a set of items can be presented to the user, which can correspond to at least one of similarly related user clusters or opposite user clusters.

In Step 806, a selection is received of an item from at least one other cluster. In some embodiments, the selection can indicate selection or removal of an item from a user cluster, in a similar manner as discussed above. In some embodiments, the selection can be associated with an entire and/or portion of a presented cluster. While the discussion herein focuses on selection of a single item, it should be understood that multiple items and multiple clusters can be presented and selected without departing from the scope of the instant disclosure.

In Step 808, a vector associated with the selected item is identified; and in Step 810, taste vectors for the user are adjusted. In some embodiments, the adjustment of the user's vectors can be based on their current vector, the vector of the selected item, and/or centroids of the vectors (e.g., centroid of the vector the user selected, for example).

For example, the user's current taste vector is Vi, as discussed above. The vector for the selected item is Vk. Therefore, the new vector $V_{new}$ can be realized by: (Vi+Vk)/2.

In some embodiments, if multiple clusters "V1, V2, . . . Vr" are selected (from Step 806), then $V_{new}$ can equal: (Vi+(V1+V2+ . . . Vr)/r)/2.

In Step 812, the adjusted vectors are then used to present new content recommendations to the user. Moreover, in a similar manner as discussed above, the information related to the new content recommendation and the vector adjustment from Step 810 can be stored and used to train a new model and/or re-train the recommendation model, as in Step 814.

Thus, Process 800 enables users to escape from recommendations that are tied to vector data associated with clustered data related to the user's activities and tastes.

Figure 9:
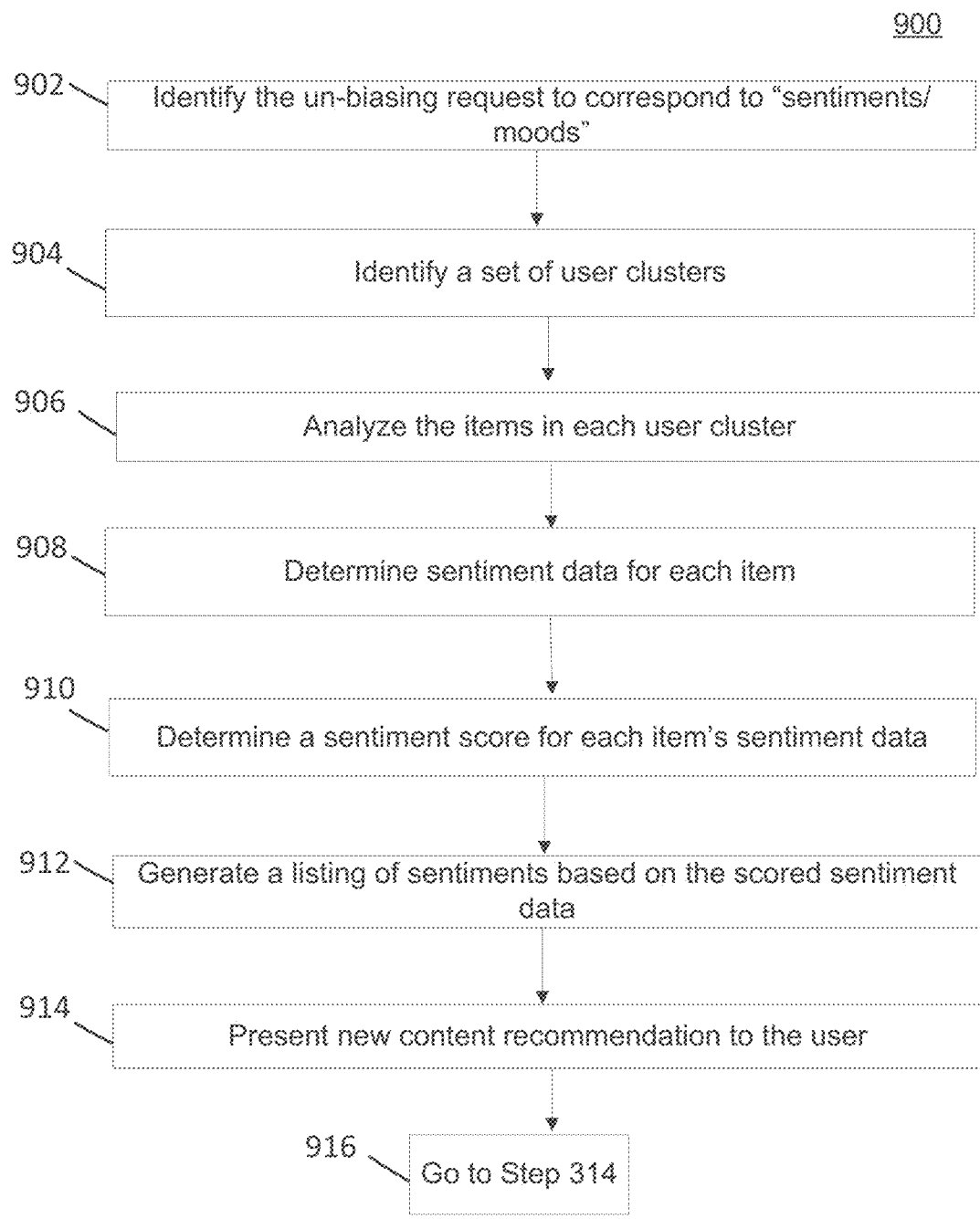
FIG. 9 illustrates an exemplary data flow according to some embodiments of the present disclosure.

In FIG. 9, Process 900 is disclosed which provides a non-limiting example embodiment for performing an un-biasing request that corresponds to a "sentiment" (or mood) (item 508 of FIG. 5, as discussed above). According to some embodiments, Steps 902-912 of Process 900 can be performed by explore module 204 of recommendation engine 200 (and provide non-limiting example embodiments of Steps 306-312 of Process 300), and Steps 914-916 can be performed by output module 208.

Process 900 begins with Step 902 where an input can be provided by the user that corresponds to a "sentiments" type of depersonalization. For example, Step 902 can involve a user selecting item 508 from UI 500, as discussed above. In some embodiments, Step 902 (and item 508) can enable a user to input a sentiment to escape from, as discussed below.

In some embodiments, "sentiments" (or "moods") can correspond to, but are not limited to, expressions of user preferences, emotions, feelings, tastes, and the like. For example, a sentiment can be a form of data, metadata (e.g., a tag) that indicates a feeling towards an item. In some embodiments, the sentiment can correspond to comments about items, feedback, rendering history, and the like, or some combination thereof. In some embodiments, sentiment data can be derived, extracted, identified or determined from data and/or metadata related to a content item (e g., data associated with a content item, or data identifiable from pages where the content item is hosted, for example).

In Step 904, engine 200 can analyze the selected content item from items 402-410 (from Step 306 from which the request 902 is based), and determine sentiment data related to the selected content item. While the discussion herein is focused on a single content item, it should not be construed as limiting, as embodiments exist without departing from the scope of the instant disclosure for performing Process 900 based on multiple selected content items.

In some embodiments, Step 904 can then involve identifying a set of user clusters that correspond to the determined sentiment. This can be based on a similarity analysis of the sentiment of the selected content item(s) and the data associated with the user clusters.

In some embodiments, Step 904 can involve engine 200 utilizing natural language processing (NLP) models to extract sentiment information from the data and/or metadata of the selected content item. In some embodiments, sentiment analysis models, such as, but not limited to, Naïve Bayes, Logistic Regression and Support Vector Machines (SVM), for example, can be applied to the NLP processed information to determine a sentiment for the content item.

Thus, in some embodiments, in Step 904, a set of user clusters can be identified based on the NLP and sentiment analysis modelling.

In Step 906, each identified user cluster, and the items included therein, can be analyzed, and as a result, in Step 908, sentiment data for each item is determined. Steps 906 and 908 can be performed in a similar manner as discussed above in relation to Step 904.

In Step 908, a sentiment score for each content item is determined, which is based on the determined sentiment data. In some embodiments, Step 908 can be performed by engine 200 executing a TD/IDF (Term Frequency/Inverse Document Frequency) algorithm, which can quantify terms (that correspond to particular sentiments) and determine how often they occur in the set of user clusters.

In some embodiments, for example, sentiments can be related by terms such as, but not limited to, light-hearted, dark, humorous, melancholy, optimistic, pessimistic, liberal, conservative, and the like. In Step 908, it can be determined how often these sentiment terms are found in relation to the content items in the user clusters (and selected content item), and for the sentiment terms with an occurrence satisfying a threshold number of times (e.g., 100 times or more), they can be identified.

In Step 910, the identified sentiment terms satisfying the threshold can be compiled into a listing (with the terms not satisfying the threshold being filtered out), and the listing can be ranked based on the scoring (e.g., terms with higher occurrences can be ranked higher than those with less occurrences).

In some embodiments, Step 910 can involve displaying terms with their opposite sentiments. This can be performed when a list of sentiments is larger than a threshold value. For example, if there are more than n sentiment terms satisfying the threshold (e.g., 150 words occurring at least 100 times), then each sentiment term can be displayed in conjunction with their anti-sentiment (e g, lighthearted/dark, humorous/melancholy, optimistic/pessimistic, and the like).

In Step 912, the generated list of sentiment terms can be presented to the user, which can be interacted with to select and/or remove particular sentiments. In some embodiments, the list can be provided as a drop-down menu, sidebar, overlay or pop-up window, or any other type of interactive window or UI that can be displayed on UE.

In Step 914, the selected and/or unselected but not removed sentiment terms from the list can then be utilized to search for and identify new content recommendations to the user. In a similar manner as discussed above, the information related to the new content recommendation and the sentiment data from Step 912 can be stored and used to train a new model and/or re-train the recommendation model, as in Step 916.

Thus, Process 900 enables users to escape recommendations that are tied to particular types of sentiments so as to engage in content that emits and/or emotes other types of moods.

Figure 10:
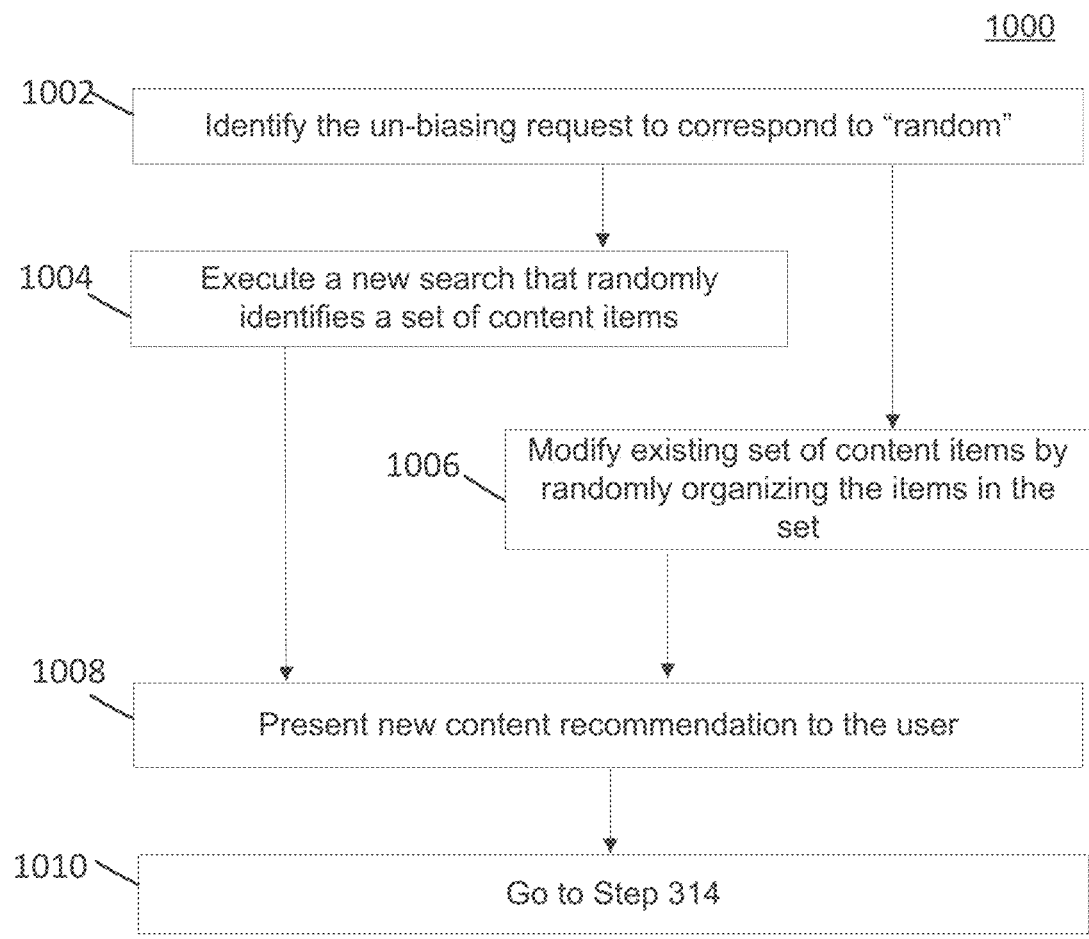
FIG. 10 illustrates an exemplary data flow according to some embodiments of the present disclosure.

In FIG. 10, Process 1000 is disclosed which provides a non-limiting example embodiment for performing a "random" un-biasing request (item 510 of FIG. 5, as discussed above). According to some embodiments, Steps 1002-1006 of Process 1000 can be performed by explore module 204 of recommendation engine 200 (and provide non-limiting example embodiments of Steps 306-312 of Process 300); and Steps 1008-1010 can be performed by output module 208.

Process 1000 begins with Step 1002 where an input can be provided by the user that requests a "random" depersonalization. In some embodiments, this can involve identifying a set of content items that are not within a user's current result set and/or are randomly selected by a randomized algorithm (e.g., Monte Carlo algorithms or Las Vegas algorithms, for example, where inputs are randomized). For example, Step 1002 can involve a user selecting item 510 from UI 500, as discussed above.

In some embodiments, Process 1000 can proceed from Step 1002 to Step 1004, where a new search is performed that randomly identifies a set of content items. In some embodiments, the new search can be performed by a randomized algorithm executed by engine 200, as discussed above.

In some embodiments, Process 1000 can proceed from Step 1002 to Step 1006, where rather than performing a new search, the content items previously provided can be randomized. This can also be performed by a randomization algorithm, as discussed above, and in some embodiments, can include the inclusion of some existing content items from the previous recommendation. In some embodiments, Step 1006 can involve executing a randomization algorithm with the inputs being from Step 302 (as opposed to Step 1004 being executed with randomized inputs).

Steps 1004 and 1006 each proceed to Step 1008, where a new set of content recommendations can be presented to the user. In a similar manner as discussed above, the information related to the new content recommendation and the randomized search (from Steps 1004 and 1006) can be stored and used to train a new model and/or re-train the recommendation model, as in Step 1010.

Figure 11:
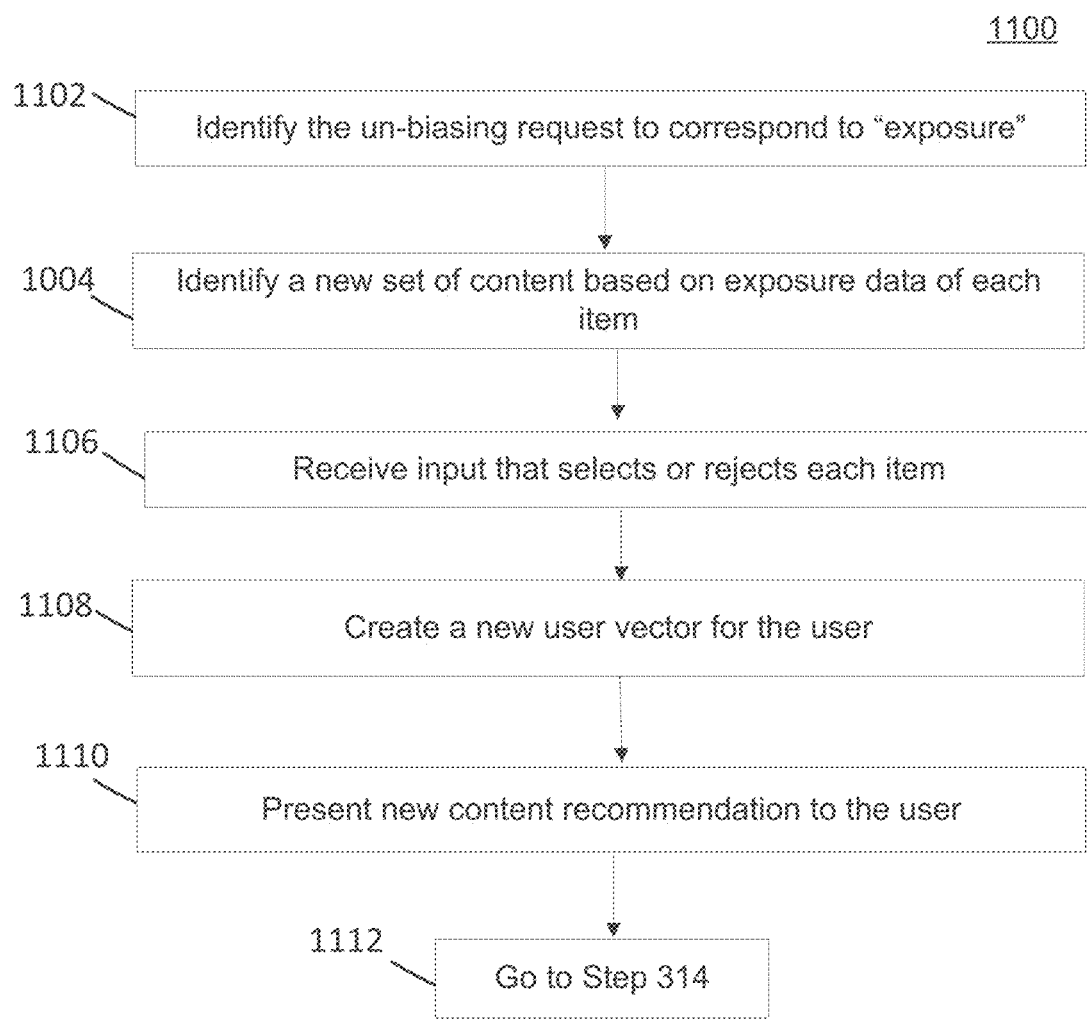
FIG. 11 illustrates an exemplary data flow according to some embodiments of the present disclosure.

In FIG. 11, Process 1100 is disclosed which provides a non-limiting example embodiment for performing an unbiasing request based on "exposure". "Exposure," as used herein, corresponds to how exposed or interacted with content items are on a network, which can be according to a specific set of users, geographic regions and/or over periods of time, and the like. In some embodiments, such exposure, therefore, can correspond to popularity and/or whether the content is trending, as indicated in item 512 and item 514, respectively. Thus, interaction with item 512 or item 514 can trigger Process 1100.

In some embodiments, exposure can also include, but is not limited to, frequency, shares, downloads, uploads, views, likes, dislikes, and/or any other type of information that indicates how popular or viewed a content item is on a network.

According to some embodiments, Steps 1102-1108 of Process 1100 can be performed by explore module 204 of recommendation engine 200 (and provide non-limiting example embodiments of Steps 306-312 of Process 300); and Steps 1110-1112 can be performed by output module 208.

Process 1100 begins with Step 1102 where an input can be provided by the user that requests an "exposure" depersonalization. In Step 1104, a new search is performed based on exposure data and its results are provided to a user. For example, if exposure corresponds to popularity, then the top n most popular content items can be retrieved for presentation (which can be current, or another time period). In some embodiments, popularity data can be filtered according to user preferences and/or a category of content. In another non-limiting example, if exposure corresponds to trending, then the top n content items that are currently trending can be retrieved for presentation. A trending criteria, in a similar manner to popularity, can be tied to user preferences and/or a category of content, and can be for a particular time period.

In Step 1106, input is received from the user that either selects and/or rejects at least a portion of the new content recommendations from Step 1104. The selection and/or rejection is similar to the selection or rejection (or removal) of content items discussed above.

In Step 1108, based on the content items remaining in the provided results after the selection and/or removal from Step 1106, a new taste vector for the user can be compiled. As discussed above, this can be a n-dimensional vector that is translated from the actions of the user in view of the presented content items (e.g., selection) and/or the data and/or metadata of those content items. In some embodiments, a current taste vector for a user can be adjusted based on this data, which can be performed in a similar manner as discussed above.

In Step 1110, a new search is performed based on the new taste vector, and is presented to the user as a set of content recommendations. In a similar manner as discussed above, the information related to the new content recommendation and the new/adjusted taste vector (from 1108) can be stored and used for further training of the vectors and/or recommendation models, as in Step 1112.

Figure 12:
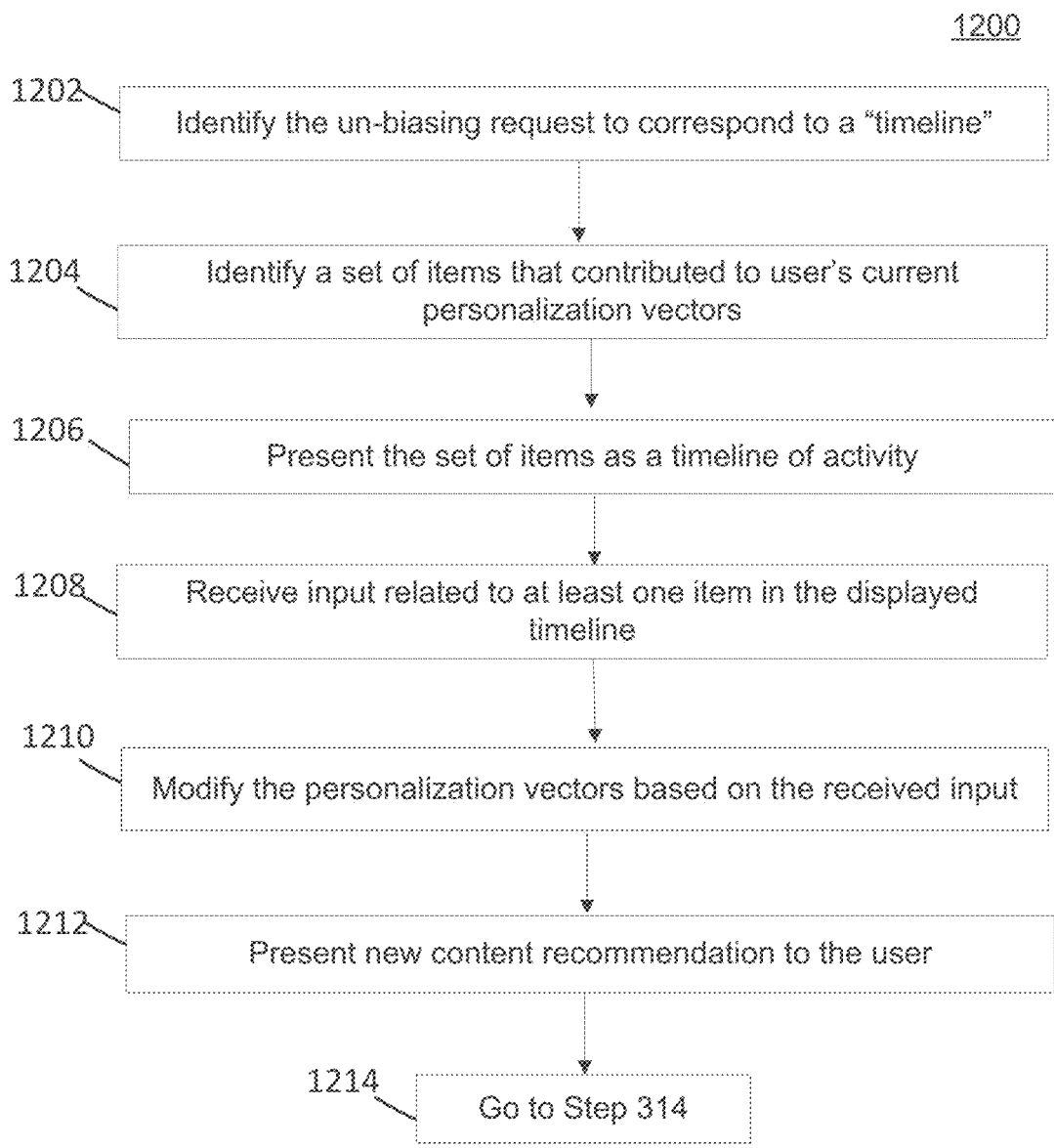
FIG. 12 illustrates an exemplary data flow according to some embodiments of the present disclosure.
Figure 13:
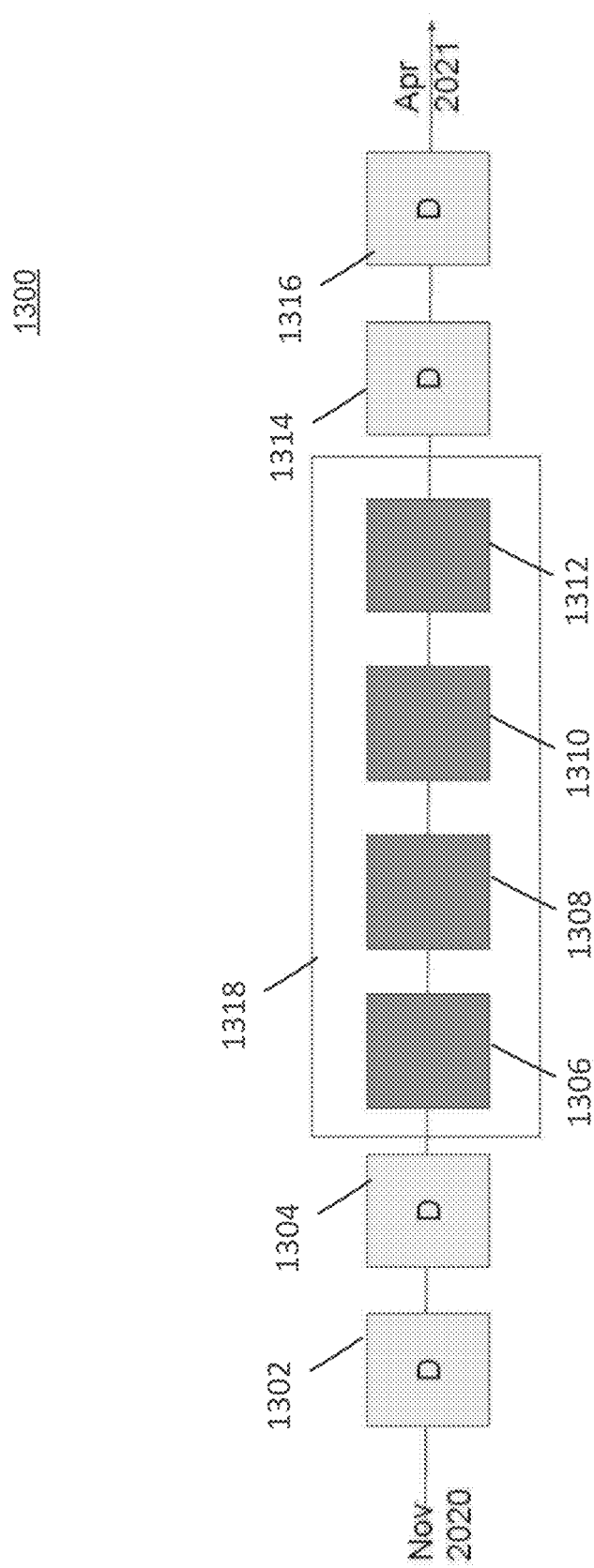
FIG. 13 illustrates a non-limiting example of a UI according to some embodiments of the present disclosure.

In FIG. 12, Process 1200 is disclosed which provides a non-limiting example embodiment for performing an unbiasing request based on a "timeline". A timeline corresponds to a displayable set of interface objects that provides a user with a visibly consumable rendering of the information that is used to compile the user's current taste vector(s) (e.g., the user's vector data that is used as a basis for the user's recommendation model, as discussed above). For example, the information can indicate, but is not limited to, content types, sources, time, date, frequency, views, actions taken thereon, and the like, and can be sequentially ordered and displayed according to how and when a user interacted with such data. An example of a timeline is depicted in FIG. 13, as discussed below.

According to some embodiments, Steps 1202-1210 of Process 1200 can be performed by explore module 204 of recommendation engine 200 (and provide non-limiting example embodiments of Steps 306-312 of Process 300); and Steps 1212-1214 can be performed by output module 208.

Process 1200 begins with Step 1202 where an input can be provided by the user that requests a "timeline" depersonalization. For example, interaction with item 516 can trigger Step 1202.

In Step 1204, a user profile and/or collection of stored data related to the user's activities (e.g., both network and real-world data) can be identified. This data can be analyzed and vectors and the data associated therewith that correspond to the user's currently understood tastes/interests can be identified.

In Step 1206, the identified data can then be formulated/compiled into a timeline of activity for the user.

For example, as depicted in FIG. 13, upon interacting with timeline item 516 on UI 500, UI 1300 can be presented to the user, which provides a timeline of taste/interest information of the user. The non-limiting example illustrated in FIG. 13 provides a snapshot of activity for the user from November 2020 to April 2021, and includes the data items 1302-1316, which can be interactive, deep-linking interface objects that each correspond to networked activity of the user at a specific time.

In Step 1208, the user can interact with the timeline to provide input corresponding to particular items the user desires to focus on as a filtering search. In some embodiments, the interactions the user can perform can include, but are not limited to, scrolling, enlarging, zooming out/in, clicking on, navigating to additionally related content, and the like, or some combination thereof.

For example, as depicted in FIG. 13, the user can click on item 1306, which can enable a pop-up window to display data and/or metadata related to that content item (e.g., category, time, source, attributes, sentiment, exposure, clusters, and the like). This can provide, for example, information about the content item as well as information related to the user's interaction with the content item that caused it to be included in the timeline.

In some embodiments, the user can select or remove at least one displayed item on the timeline. For example, as depicted in FIG. 13, the user can selected items 1306-1312 (as indicated by item 1318), and unselected items 1302, 1304, 1314 and 1316 may be discarded in another non-limiting example, the user can provide input to remove the items associated with items 1318, whereby the timeline will be modified to only display items 1302, 1304, 1314 and 1316.

Thus, in Step 1210, the user's current taste vector(s) can be modified (or adjusted) based on the data and/or metadata remaining (or un-discarded) in the timeline, which is a by-product of the selections and/or removals of items from Step 1208. In some embodiments, the modified timeline can be translated to a vector, which can then be used as a basis for modifying the user's taste vector(s). The modification (or adjustment) of the existing taste vector(s) can be performed in a similar manner as discussed above for other modifications/adjustments.

In Step 1212, a new search for content is generated and performed based on the modified taste vectors, and its results are presented to the user. In a similar manner as discussed above, the information related to the new content recommendation and the new/adjusted taste vector(s) (from 1210) can be stored (as in Step 314) and used to train a new model and/or re-train the recommendation model, as in Step 1214.

Figure 14:
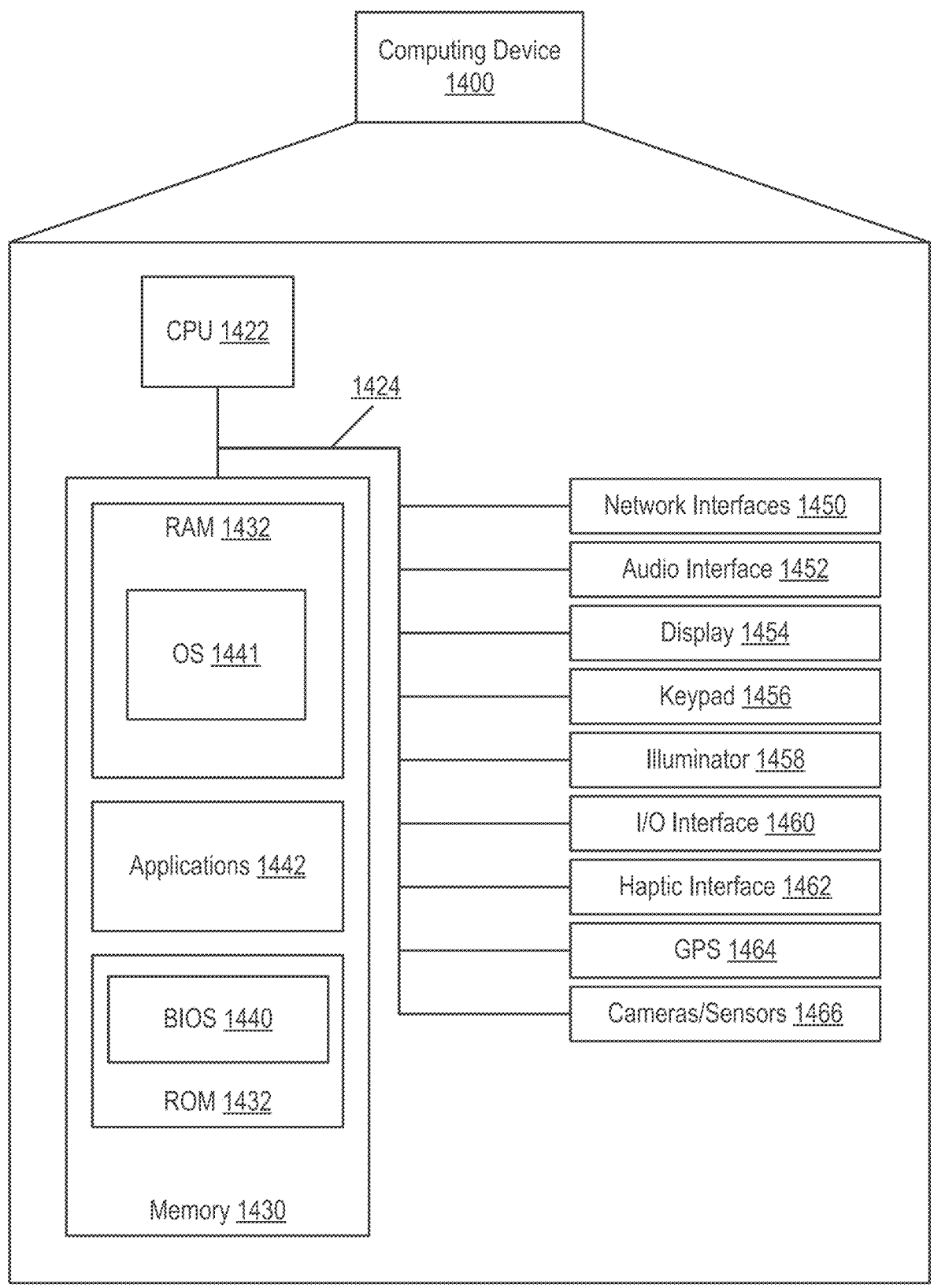
FIG. 14 is a block diagram illustrating a computing device showing an example of a client or server device used in various embodiments of the present disclosure.

FIG. 14 is a block diagram illustrating a computing device showing an example of a client or server device used in the various embodiments of the disclosure.

The computing device 1400 may include more or fewer components than those shown in FIG. 14, depending on the deployment or usage of the device 1400. For example, a server computing device, such as a rack-mounted server, may not include audio interfaces 1452, displays 1454, keypads 1456, illuminators 1458, haptic interfaces 1462, GPS receivers 1464, or cameras/sensors 1466. Some devices may include additional components not shown, such as graphics processing unit (GPU) devices, cryptographic co-processors, artificial intelligence (AI) accelerators, or other peripheral devices.

As shown in FIG. 14, the device 1400 includes a central processing unit (CPU) 1422 in communication with a mass memory 1430 via a bus 1424. The computing device 1400 also includes one or more network interfaces 1450, an audio interface 1452, a display 1454, a keypad 1456, an illuminator 1458, an input/output interface 1460, a haptic interface 1462, an optional global positioning systems (GPS) receiver 1464 and a camera(s) or other optical, thermal, or electromagnetic sensors 1466. Device 1400 can include one camera/sensor 1466 or a plurality of cameras/sensors 1466. The positioning of the camera(s)/sensor(s) 1466 on the device 1400 can change per device 1400 model, per device 1400 capabilities, and the like, or some combination thereof.

In some embodiments, the CPU 1422 may comprise a general-purpose CPU. The CPU 1422 may comprise a single-core or multiple-core CPU. The CPU 1422 may comprise a system-on-a-chip (SoC) or a similar embedded system. In some embodiments, a GPU may be used in place of, or in combination with, a CPU 1422. Mass memory 1430 may comprise a dynamic random-access memory (DRAM) device, a static random-access memory device (SRAM), or a Flash (e.g., NAND Flash) memory device. In some embodiments, mass memory 1430 may comprise a combination of such memory types. In one embodiment, the bus 1424 may comprise a Peripheral Component Interconnect Express (PCIe) bus. In some embodiments, the bus 1424 may comprise multiple busses instead of a single bus.

Mass memory 1430 illustrates another example of computer storage media for the storage of information such as computer-readable instructions, data structures, program modules, or other data. Mass memory 1430 stores a basic input/output system ("BIOS") 1440 for controlling the low-level operation of the computing device 1400. The mass memory also stores an operating system 1441 for controlling the operation of the computing device 1400.

Applications 1442 may include computer-executable instructions which, when executed by the computing device 1400, perform any of the methods (or portions of the methods) described previously in the description of the preceding Figures. In some embodiments, the software or programs implementing the method embodiments can be read from a hard disk drive (not illustrated) and temporarily stored in RAM 1432 by CPU 1422. CPU 1422 may then read the software or data from RAM 1432, process them, and store them to RAM 1432 again.

The computing device 1400 may optionally communicate with a base station (not shown) or directly with another computing device. Network interface 1450 is sometimes known as a transceiver, transceiving device, or network interface card (NIC).

The audio interface 1452 produces and receives audio signals such as the sound of a human voice. For example, the audio interface 1452 may be coupled to a speaker and microphone (not shown) to enable telecommunication with others or generate an audio acknowledgment for some action. Display 1454 may be a liquid crystal display (LCD), gas plasma, light-emitting diode (LED), or any other type of display used with a computing device. Display 1454 may also include a touch-sensitive screen arranged to receive input from an object such as a stylus or a digit from a human hand.

Keypad 1456 may comprise any input device arranged to receive input from a user. Illuminator 1458 may provide a status indication or provide light.

The computing device 1400 also comprises an input/output interface 1460 for communicating with external devices, using communication technologies, such as USB, infrared, Bluetooth™, or the like. The haptic interface 1462 provides tactile feedback to a user of the client device.

The optional GPS transceiver 1464 can determine the physical coordinates of the computing device 1400 on the surface of the Earth, which typically outputs a location as latitude and longitude values. GPS transceiver 1464 can also employ other geo-positioning mechanisms, including, but not limited to, triangulation, assisted GPS (AGPS), E-OTD, CI, SAI, ETA, BSS, or the like, to further determine the physical location of the computing device 1400 on the surface of the Earth. In one embodiment, however, the computing device 1400 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   receiving, by a device, a request for content from a user;
   providing, by the device, a set of personalized content items based on a recommendation model associated with the user in response to the request for content;
   receiving, by the device, an un-biasing request from the user, the un-biasing request comprising information indicating a type of request to un-bias results output from the recommendation model associated with the user;
   analyzing, by the device, the set of personalized content items based at least on the un-biasing request;
   identifying, by the device, based on the analyzed set of personalized content items, a new set of content items, at least a portion of the new set of content items comprising characteristics different from characteristics of the set of personalized content items; and
   providing, by the device over a network, the new set of content items to the user for display on a device of the user in response to the un-biasing request.

2. The method of claim 1, further comprising:
   identifying that the type of request corresponds to a given item;
   identifying at least one of the set of personalized content items as the given item;
   determining a similarity group of content items based on the given item, each item in the similarity group satisfying a similarity threshold to the given item;
   determining an opposite group of content items based on the given item, each item in the opposite group failing to satisfy the similarity threshold to the given item; and
   analyzing each item in each group, and determining similarities and differences between the items in each group, wherein identification of the new set of content items is further based on information related to the determined similarities and differences.

3. The method of claim 2, further comprising:
   enabling selection and removal of at least a portion of the items in each group, wherein the analysis of items in each group is based on remaining items in each group after the enabled selection and removal.

4. The method of claim 1, further comprising:
   identifying that the type of request corresponds to an attribute;
   analyzing the set of personalized content items and determining a set of attributes, the attributes being at least one of a boolean type, categorical type and numerical type;
   receiving input identifying at least one of the set of attributes;

determining a type of the identified attribute, wherein
when the identified attribute is the boolean type, computing an escape from the personalized set of recommendations based on a boolean computation,
when the identified attribute is the categorical type, computing an escape from the personalized set of recommendations based on a categorical computation, and
when the identified attribute is the numerical type, computing an escape from the personalized set of recommendations based on a numerical computation; and
performing the identification of the new set of content items based on the determined type of computation.

5. The method of claim 1, further comprising:
identifying that the type of request corresponds to a user cluster, the user cluster being associated with the user and corresponding to a grouping of data related to a context, the user cluster having a corresponding vector;
identifying a set of other user clusters, each other user cluster corresponding to a context that is different than the context of the user's user cluster;
receiving input identifying at least one item from at least one other user cluster;
identifying a vector associated with the identified item; and
computing a new vector for the user based on the user cluster vector and the identified item vector, wherein the identification of the new set of content items is based on the new vector.

6. The method of claim 1, further comprising:
identifying that the type of request corresponds to a sentiment, the sentiment corresponding to a selected item from the set of personalized content items;
identifying a set of user clusters based on the sentiment;
analyzing each item in each user cluster, and determining at least one sentiment for each item;
determining a sentiment score for each item based on the at least one sentiment determined for the item;
generating a listing of sentiment terms based on the determined sentiment scoring; and
receiving interaction with at least one sentiment term in the listing, wherein the identification of the new set of content items is based on the received interaction with at least one sentiment in the listing.

7. The method of claim 1, further comprising:
identifying that the type of request is a request to perform a random search; and
executing a search for content using a randomized algorithm to identify a new set of content items, wherein the identification of the new set of content items is based on the search.

8. The method of claim 1, further comprising:
identifying that the type of request corresponds to exposure of a selected content item, wherein exposure relates to at least one of popularity or trends of a period of time;
executing a search for content based on information related to the exposure;
receiving input related to selections or rejections of at least a portion of results of the search; and
creating a new user vector based on the input-based results, wherein the identification of the new set of content items is based on the new user vector.

9. The method of claim 1, further comprising:
identifying that the type of request corresponds to a timeline, the timeline comprising a displayable and interactive interface object that displays user vector data for which the recommendation model of the user is based;
causing display of the timeline on the device of the user;
receiving information related to interactions with the timeline by the user; and
modifying the user vector data based on the received information, wherein the identification of the new set of content items is based on the modified user vector data.

10. The method of claim 1, further comprising:
modifying a user interface (UI) that displays the set of personalized content items to display an interface object that enables the un-biasing request, wherein the un-biasing request is in response to user interaction with the interface object; and
causing a display of a set of interface objects that enables identification of the type of request, wherein the analysis of the set of personalized content items is further based on the type of request.

11. The method of claim 1, further comprising:
storing, in a database associated with the device, information associated with the new set of content items and the un-biasing request; and
further training the recommendation model based on the stored information.

12. A device comprising:
a processor configured to:
receive a request for content from a user;
provide a set of personalized content items based on a recommendation model associated with the user in response to the request for content;
receive an un-biasing request from the user, the un-biasing request comprising information indicating a type of request to un-bias results output from the recommendation model associated with the user;
analyze the set of personalized content items based at least on the un-biasing request;
identify, based on the analyzed set of personalized content items, a new set of content items, at least a portion of the new set of content items comprising characteristics different from characteristics of the set of personalized content items; and
provide, over a network, the new set of content items to the user for display on a device of the user in response to the un-biasing request.

13. The device of claim 12, the processor further configured to:
identify that the type of request corresponds to a given item;
identify at least one of the set of personalized content items as the given item;
determine a similarity group of content items based on the given item, each item in the similarity group satisfying a similarity threshold to the given item;
determine an opposite group of content items based on the given item, each item in the opposite group failing to satisfy the similarity threshold to the given item; and
analyze each item in each group, and determine similarities and differences between the items in each group, wherein identification of the new set of content items is further based on information related to the determined similarities and differences.

14. The device of claim 12, the processor further configured to:
   identify that the type of request corresponds to an attribute;
   analyze the set of personalized content items and determine a set of attributes, the attributes being at least one of a boolean type, categorical type and numerical type;
   receive input identifying at least one of the set of attributes;
   determine a type of the identified attribute, wherein
      when the identified attribute is the boolean type, compute an escape from the personalized set of recommendations based on a boolean computation,
      when the identified attribute is the categorical type, compute an escape from the personalized set of recommendations based on a categorical computation, and
      when the identified attribute is the numerical type, compute an escape from the personalized set of recommendations based on a numerical computation; and
   perform the identification of the new set of content items based on the determined type of computation.

15. The device of claim 12, the processor further configured to:
   identify that the type of request corresponds to a user cluster, the user cluster being associated with the user and corresponding to a grouping of data related to a context, the user cluster having a corresponding vector;
   identify a set of other user clusters, each other user cluster corresponding to a context that is different than the context of the user's user cluster;
   receive input identifying at least one item from at least one other user cluster;
   identify a vector associated with the identified item; and
   compute a new vector for the user based on the user cluster vector and the identified item vector, wherein the identification of the new set of content items is based on the new vector.

16. The device of claim 12, the processor further configured to:
   identify that the type of request corresponds to a sentiment, the sentiment corresponding to a selected item from the set of personalized content items;
   identify a set of user clusters based on the sentiment;
   analyze each item in each cluster, and determine at least one sentiment data for each item;
   determine a sentiment score for each item based on the at least one sentiment determined for the item;
   generate a listing of sentiment terms based on the determined sentiment scoring; and
   receive interaction with at least one sentiment term in the listing, wherein the identification of the new set of content items is based on the received interaction with at least one sentiment in the listing.

17. The device of claim 12, the processor further configured to:
   identify that the type of request is a request to perform a random search; and
   execute a search for content using a randomized algorithm to identify a new set of content items, wherein the identification of the new set of content items is based on the search.

18. The device of claim 12, the processor further configured to:
   identify that the type of request corresponds to exposure of a selected content item, wherein exposure relates to at least one of popularity or trends of a period of time;
   execute a search for content based on information related to the exposure;
   receive input related to selections or rejections of at least a portion of results of the search; and
   create a new user vector based on the input-based results, wherein the identification of the new set of content items is based on the new user vector.

19. The device of claim 12, the processor further configured to:
   identify that the type of request corresponds to a timeline, the timeline comprising a displayable and interactive object that displays user vector data for which the recommendation model of the user is based;
   cause display of the timeline on the device of the users' receive information related to interactions with the timeline by the user; and
   modify the user vector data based on the received information, wherein the identification of the new set of content items is based on the modified user vector data.

20. A non-transitory computer-readable medium tangibly encoded with instructions, that when executed by a processor of a device, perform a method comprising:
   receiving, by the device, a request for content from a user;
   providing, by the device, a set of personalized content items based on a recommendation model associated with the user in response to the request for content;
   receiving, by the device, an un-biasing request from the user, the un-biasing request comprising information indicating a type of request to un-bias results output from the recommendation model associated with the user;
   analyzing, by the device, the set of personalized content items based at least on the un-biasing request;
   identifying, by the device, based on the analyzed set of personalized content items, a new set of content items, at least a portion of the new set of content items comprising characteristics different from characteristics of the set of personalized content items; and
   providing, by the device over a network, the new set of content items to the user for display on a device of the user in response to the un-biasing request.

* * * * *